United States Patent
Shirai et al.

(10) Patent No.: US 12,529,748 B2
(45) Date of Patent: Jan. 20, 2026

(54) MAGNETIC RESONANCE IMAGING APPARATUS AND IMAGE RECONSTRUCTION METHOD

(71) Applicant: FUJIFILM Healthcare Corporation, Kashiwa (JP)

(72) Inventors: Toru Shirai, Chiba (JP); Yukio Kaneko, Chiba (JP); Yosuke Otake, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 189 days.

(21) Appl. No.: 18/618,225

(22) Filed: Mar. 27, 2024

(65) Prior Publication Data
US 2024/0361415 A1   Oct. 31, 2024

(30) Foreign Application Priority Data
Apr. 28, 2023   (JP) ................ 2023-074669

(51) Int. Cl.
| | | |
|---|---|---|
| G01R 33/565 | (2006.01) | |
| A61B 5/00 | (2006.01) | |
| G01R 33/56 | (2006.01) | |
| G06T 7/11 | (2017.01) | |

(52) U.S. Cl.
CPC ...... *G01R 33/56509* (2013.01); *A61B 5/7475* (2013.01); *G01R 33/5608* (2013.01); *G06T 7/11* (2017.01); *G06T 2207/10088* (2013.01); *G06T 2207/30004* (2013.01)

(58) Field of Classification Search
CPC .............. A61B 5/7475; G01R 33/5608; G01R 33/56509; G06T 7/11; G06T 2207/10088; G06T 2207/30004
See application file for complete search history.

(56) References Cited

U.S. PATENT DOCUMENTS

| | | | |
|---|---|---|---|
| 10,564,244 B2* | 2/2020 | Fenchel | G01R 33/5673 |
| 2011/0175609 A1* | 7/2011 | Hu | G01R 33/3415 |
| | | | 324/309 |
| 2024/0046533 A1* | 2/2024 | Haldar | G01R 33/5608 |

FOREIGN PATENT DOCUMENTS

JP   2009-106480 A   5/2009

* cited by examiner

*Primary Examiner* — Gregory H Curran
(74) *Attorney, Agent, or Firm* — Paul Teng

(57) ABSTRACT

Provided is a weighted reconstruction technique of a channel for suppressing a blood flow artifact and a body movement artifact in imaging using a multi-channel reception coil. In a case of reconstructing an image of a subject by using a nuclear magnetic resonance signal collected by each of a plurality of channels of a reception coil, by using a positioning image, an organ or a region causing a blood flow artifact and a body movement artifact in the subject is specified, a weight of each channel is decided by using information on the specified organ or region, and weighted reconstruction is performed by using the weight.

11 Claims, 7 Drawing Sheets

FIG. 6
CH 10
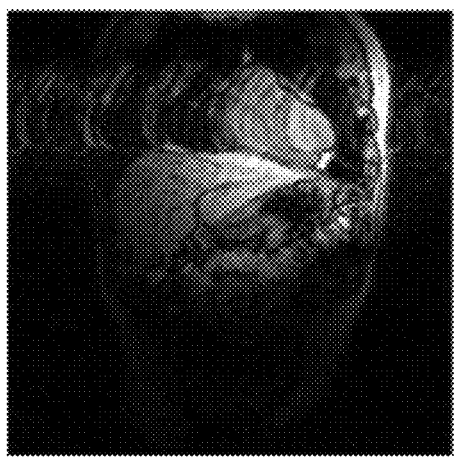
CH 7
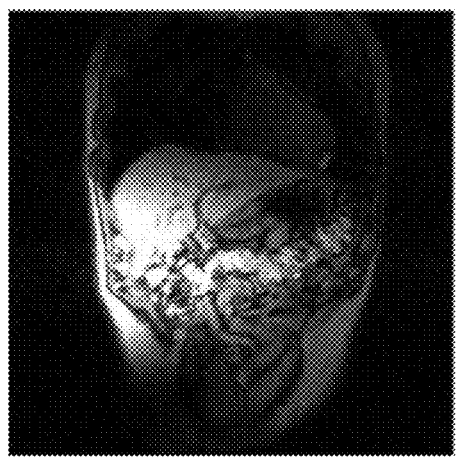
RECONSTRUCTION IN
RELATED ART
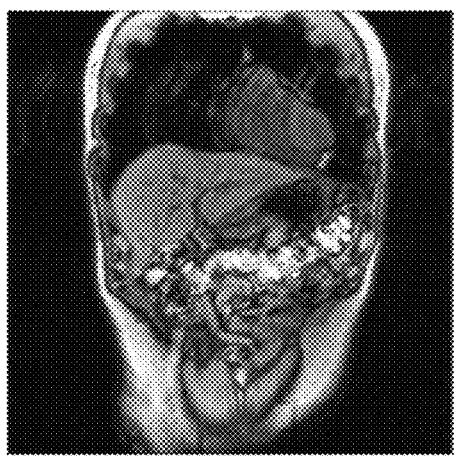
PRESENT METHOD
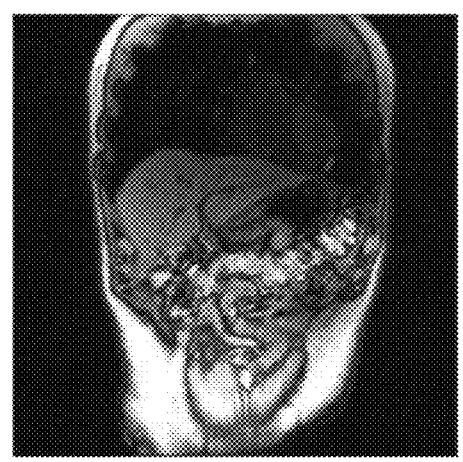

MAGNETIC RESONANCE IMAGING APPARATUS AND IMAGE RECONSTRUCTION METHOD

CROSS-REFERENCE TO RELATED APPLICATION

The present application claims priority from Japanese Patent Application No. 2023-074669, filed on Apr. 28, 2023, the content of which is hereby incorporated by reference into this application.

BACKGROUND OF THE INVENTION

1. Field of the Invention

The present invention relates to a magnetic resonance imaging (hereinafter, abbreviated as MRI) apparatus, and particularly relates to a technique of reducing an influence of a signal from a region of a motion such as body movement.

2. Description of the Related Art

In MRI examination, an examination part is disposed in a uniform static magnetic field region, and a reception coil is installed at the examination part. In recent years, a multi-channel reception coil has been used in order to increase a speed of imaging or to improve an image quality. The multi-channel reception coil consists of a plurality of elements, and each of the elements (channels) receives a nuclear magnetic resonance signal. In image reconstruction, the nuclear magnetic resonance signals from the respective channels are combined to generate an image.

In capturing an image using the multi-channel reception coil, in a case where image reconstruction is not performed through selection of appropriate element data in accordance with an examination range, a blood flow/body movement artifact caused by a subject overlaps with an organ to be diagnosed. In a case where unnecessary signal contamination or an artifact occurs, it is necessary to perform re-imaging, which causes a problem in that an examination efficiency deteriorates.

For the multi-channel reception coil, a technique has been proposed in which an image is reconstructed by selecting a channel suitable for image combination without using a signal of a channel from which a signal from an imaging part is hardly acquired (JP2009-106480A). JP2009-106480A discloses that a signal acquisition region is designated and a reception coil overlapping the region is selected (paragraph 0012) and that a signal from a reception coil outside a FOV is not used for combination (paragraph 0045).

SUMMARY OF THE INVENTION

However, JP2009-106480A does not disclose channel selection for achieving an object of suppressing a blood flow artifact and a body movement artifact. In addition, in the technique disclosed in JP2009-106480A, in order to designate a reception coil to be used for combination, it is necessary first to present disposition of a signal acquisition region and a reception coil superimposed on the signal acquisition region and to designate the signal acquisition region using the presentation by a user.

An object of the present invention is to provide a technique of a channel weighting for suppressing a blood flow artifact and a body movement artifact in imaging using a multi-channel reception coil, and to eliminate the need for user designation of a blood flow or body movement artifact region, which is a basis for the weighting, or user selection of a channel based on the user designation.

The present invention achieves the above object by specifying an organ where a blood flow/body movement artifact is likely to occur from a positioning image for main scan imaging, and reconstructing the image based on information on the organ by lowering a signal intensity of a channel of a reception coil with strong contamination of unnecessary signal and blood flow/body movement artifact.

Specifically, according to an aspect of the present invention, there is provided an MRI apparatus comprising: an imaging unit that includes a reception coil, which has a plurality of channels, detecting a nuclear magnetic resonance signal generated by a subject, and that collects the nuclear magnetic resonance signal via the reception coil; and an operation unit. The operation unit includes a reconstruction unit that reconstructs an image by using the nuclear magnetic resonance signal collected by each channel of the reception coil, a body movement-occurring organ specifying unit that specifies an organ or a region causing a blood flow artifact or a body movement artifact in the subject by using a subject image reconstructed for each channel, and a weighting amount calculation unit that decides a weight of each channel by using information on the organ or the region specified by the body movement-occurring organ specifying unit. The reconstruction unit performs weighted reconstruction by using the weight decided by the weighting amount calculation unit and the nuclear magnetic resonance signal of each channel.

In addition, according to another aspect of the present invention, there is provided an image reconstruction method of reconstructing an image of a subject by using a nuclear magnetic resonance signal collected by each of a plurality of channels of a reception coil, the method comprising: specifying an organ or a region causing a blood flow artifact and a body movement artifact in the subject; and deciding a weight of each channel by using information on the specified organ or region, and performing weighted reconstruction by using the weight.

According to the present invention, since the contamination of the unnecessary signal and the blood flow/body movement artifact can be reduced, it is possible to reduce the deterioration of the examination efficiency due to the re-imaging. In addition, since the image quality is improved, diagnostic performance is improved.

Further, according to the present invention, since a body movement-occurring organ is specified on an apparatus side from the image reconstructed for each channel, for example, from the positioning image, and the weight of the channel is decided based on information on the body movement-occurring organ in the image, it is possible to eliminate the need for the user to designate the signal acquisition region or to select the channel on a premise of a positional relationship between the organ and the channel, and to reduce the weight of the channel which is a cause of the occurrence of the blood flow/body movement artifact.

BRIEF DESCRIPTION OF THE DRAWINGS

FIG. 6 is a diagram describing an effect of Embodiment 1.

DESCRIPTION OF THE PREFERRED EMBODIMENTS

Hereinafter, embodiments of the present invention will be described.

First, an overall configuration of an MRI apparatus will be described with reference to FIG. 1.

Figure 1:
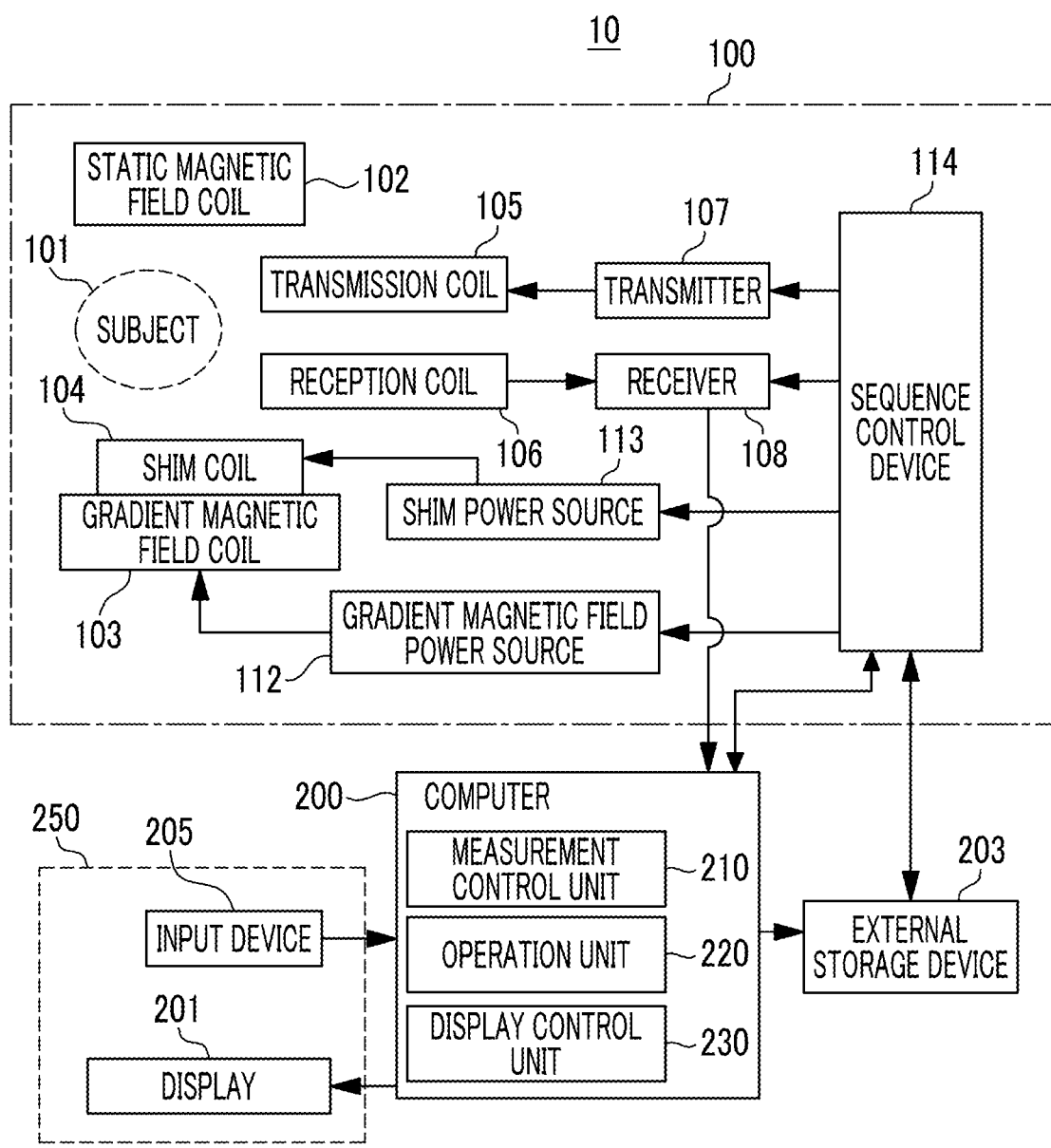
FIG. 1 is a block diagram showing an overall configuration of an MRI apparatus.

As shown in FIG. 1, an MRI apparatus 10 is mainly composed of an imaging unit 100 that collects a nuclear magnetic resonance signal generated from a subject and a computer 200 that performs control of the imaging unit 100 and operation such as image reconstruction using the nuclear magnetic resonance signal collected by the imaging unit 100, and comprises a display 201, an input device 205, and an external storage device 203 as accessory devices of the computer 200. The display 201 and the input device 205 may be disposed close to each other and function as a UI unit 250 for interacting with a user.

The computer 200 is configured of a general-purpose computer or a workstation comprising a CPU or a GPU, and a memory, and comprises a measurement control unit 210 that controls an operation of the imaging unit 100, an operation unit 220 that operates a signal or an image collected by the imaging unit 100, and a display control unit 230 that controls display of the UI unit 250 (display). A part of the functions of the computer 200 may be realized by hardware such as a programmable IC, or may be realized by a processing apparatus different from the MRI apparatus, and the computer 200 is assumed to be used in the broadest concept including these cases.

The configuration and the functions of the imaging unit 100 are the same as those of a general MRI apparatus. In a simple description, the imaging unit 100 comprises a static magnetic field coil 102 that generates a static magnetic field, a gradient magnetic field coil 103 that generates a gradient magnetic field in three axial directions orthogonal to each other, a shim coil 104 that corrects non-uniformity of the static magnetic field, an RF transmission coil (hereinafter, referred to as a transmission coil) 105 that emits a high-frequency magnetic field, an RF reception coil (hereinafter, referred to as a reception coil) 106 that detects a nuclear magnetic resonance signal generated from a subject 101, a transmitter 107 that supplies a predetermined high-frequency current to the transmission coil 105, a receiver 108 to which the reception coil 106 is connected, a gradient magnetic field power source 112 and a shim power source 113 that drive the gradient magnetic field coil 103 and the shim coil 104, respectively, and a sequence control device 114.

The reception coil 106 is usually a multi-channel coil in which a plurality of elements (small coils) with different sensitivity distributions are combined, and generates an image by performing weighted reconstruction using a nuclear magnetic resonance signal received by each element (channel).

The sequence control device 114 drives the transmitter 107, the receiver 108, and the gradient magnetic field power source 112 in accordance with a preset pulse sequence. In this case, the measurement control unit 210 sets parameters of the pulse sequence and imaging conditions to control the sequence control device 114. There are various parameters and imaging conditions for imaging, such as a TE, a TR, a FOV, a slice thickness, the number of addition times, and a speed rate, including those set as default by the pulse sequence and those that can be set or adjusted by the user via the UI unit 250.

The MRI apparatus according to present embodiment specifies an organ or a region causing a blood flow artifact and a body movement artifact, and decides a weight of each channel used in a case of performing weighted reconstruction using the nuclear magnetic resonance signal of each channel of the reception coil 106 such that a weight of a channel of which a signal value from the specified organ or region is relatively large is small.

Figure 2:
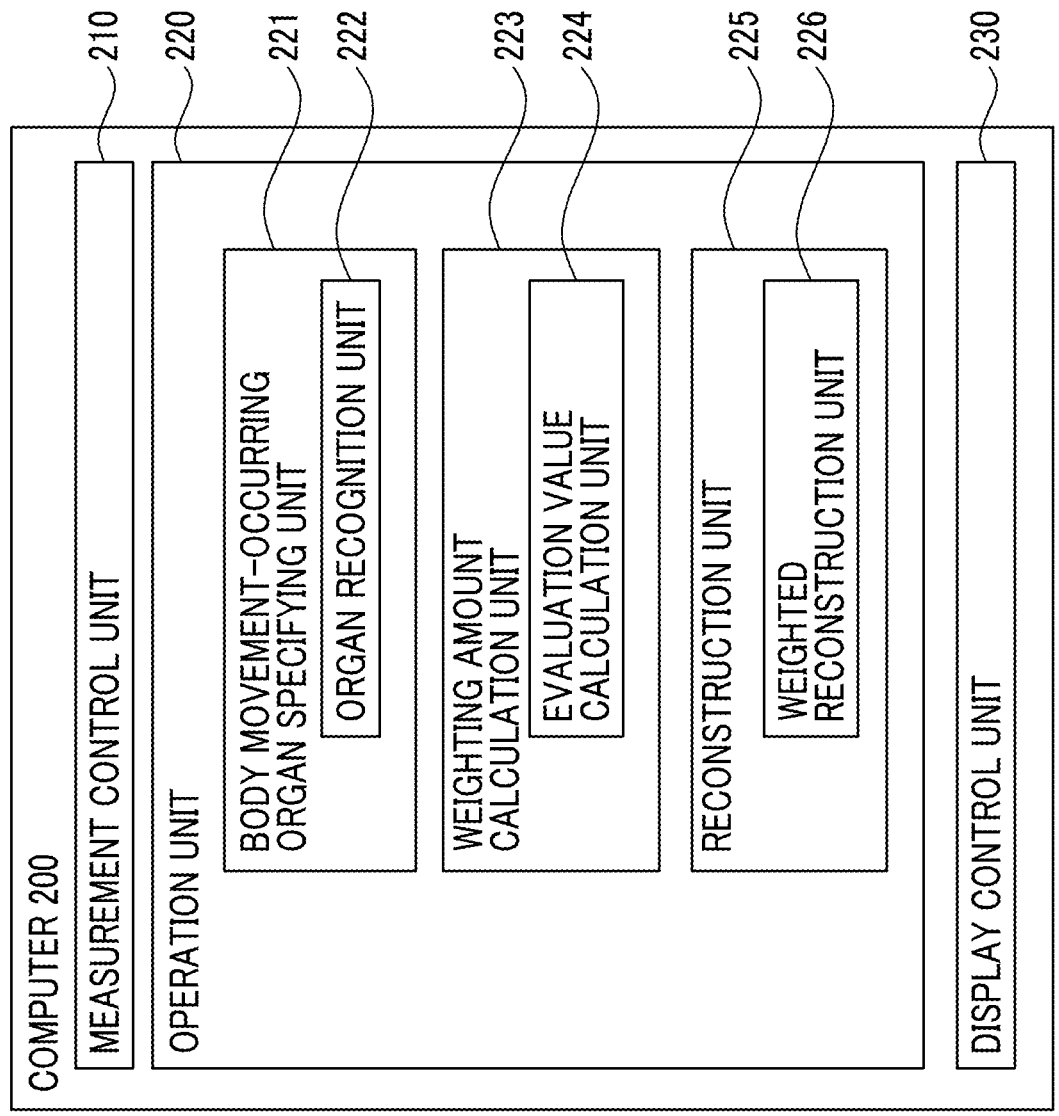
FIG. 2 is a functional block diagram of a computer of the MRI apparatus.

Therefore, as shown in FIG. 2, the operation unit 220 of the computer 200 according to the present embodiment comprises a body movement-occurring organ specifying unit 221 that specifies the organ or the region causing the blood flow artifact and the body movement artifact in the subject, a weighting amount calculation unit 223 that decides a weight of each channel by using information on the organ or the region specified by the body movement-occurring organ specifying unit 221, and a reconstruction unit 225 that performs weighted reconstruction by using the weight decided by the weighting amount calculation unit 223.

Hereinafter, an outline of processing performed by each unit of the computer 200, particularly the operation unit 220, according to the present embodiment will be described with reference to FIG. 3.

The measurement control unit 210 controls the imaging unit 100 to perform positioning imaging for deciding an imaging position prior to imaging (main scan) of an examination part of the subject (S1). An image (positioning image) obtained by the positioning imaging is an image of three cross sections (Ax plane, Cor plane, and Sag plane) including the examination part, and an operator sets the imaging conditions based on the positioning image (S2). The imaging conditions include the size and position of the FOV, a phase encoding direction, and the like. These imaging conditions are referred to in the specification of the body movement-occurring organ.

Next, the body movement-occurring organ specifying unit 221 uses the positioning image to specify the organ causing the body movement artifact or the blood flow artifact (hereinafter, simply referred to as a body movement-occurring organ) (S3), and to specify a region in which the body movement-occurring organ exists in the FOV (S4). Since the positioning image is always acquired prior to the main scan, it is most convenient to perform the organ specification using the positioning image, but it is also possible to perform pre-scan for the organ specification separately from the positioning image. In addition, there are several methods for specifying the organ, and details of processes for the methods are described in the embodiments described below.

Then, the weighting amount calculation unit 223 calculates the weight (weighting amount) of the channel based on specification results of S3 and S4 (S5). For the calculation of the weighting amount, for example, an evaluation value based on a signal value of an organ specified as the body movement-occurring organ is calculated by using a signal value of the image reconstructed for each channel, and the weighting amount is calculated using the evaluation value.

Following the positioning imaging, the measurement control unit 210 controls the imaging unit 100 to execute the main scan (S6). The above-mentioned organ specification and weighting amount calculation processing may be performed in parallel with the main scan, or may be performed before or after the main scan. The reconstruction unit 225 performs the weighted reconstruction using the nuclear magnetic resonance signal obtained in each channel by the main scan and the weight of each channel (S7).

With such processing, the MRI apparatus according to the present embodiment can reconstruct an image by reducing the weight of the signal from the body movement-occurring organ, and can obtain an image in which an artifact due to a body movement or a blood flow is reduced. In addition, since the weighting of the channel is automatically decided from an image obtained in advance of the main scan, it is possible to eliminate the need to interrupt the setting for user.

Hereinafter, a specific embodiment of the processing of the operation unit 220 will be described.

Embodiment 1

In the present embodiment, in the process of specifying the body movement-occurring organ, the positioning image is segmented, and the segmentation result is collated with a body movement-occurring organ list registered in advance to specify the body movement-occurring organ. The configuration of the operation unit 220 is the same as the configuration shown in FIG. 2. Specifically, the body movement-occurring organ specifying unit 221 includes an organ recognition unit (segmentation unit) 222, and the weighting amount calculation unit 223 includes an evaluation value calculation unit 224 that calculates an evaluation value of the channel. Hereinafter, the present embodiment will be described with reference to FIGS. 2 and 4. In addition, in FIG. 4, the same processes as that in FIG. 3 are denoted by the same reference numerals, and redundant description will be omitted.

Figure 3:
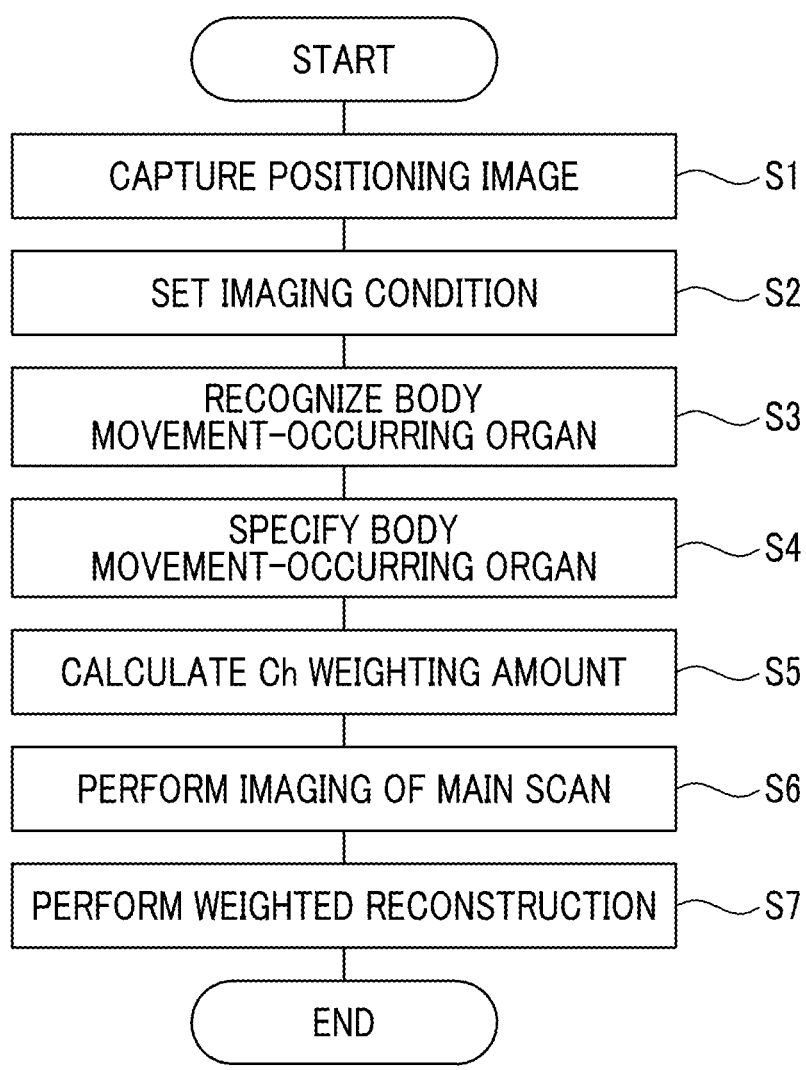
FIG. 3 is a flowchart showing a flow of imaging.

First, the positioning imaging is performed to acquire a positioning image, and imaging conditions such as the FOV and the phase encoding direction are set (FIG. 3: S1 and S2).

Then, the organ recognition unit 222 performs segmentation on the positioning image to segment the organ included in the image (S31). The segmentation is a technique of dividing a group having a similar feature amount in an image into regions, and a method using deep learning or AI is generally used. The body movement-occurring organ specifying unit 221 according to the present embodiment also performs the segmentation by implementing these methods.

Next, the body movement-occurring organ specifying unit 221 collates the organ divided by the organ recognition unit 222 with the body movement-occurring organ list to specify the body movement-occurring organ (S32). The body movement-occurring organ list is a list of a plurality of organs, such as a heart and a lung, in which it is known that there is body movement, and blood vessels (organs) having blood flow causing a large blood flow such as a pulmonary vein and an aorta, that is, a blood flow artifact, and is stored in advance in a memory in the computer 200, an external storage device (not shown), or the like, and is read out and used for collation in the body movement-occurring organ specification processing. The list may include a degree (size or frequency) of the body movement, and an organ having a predetermined size or frequency may be selected depending on the purpose of the artifact suppression or the purpose of imaging.

As a result of the collation, in a case where an organ included in the list exists in the vicinity of the examination part in the segmented image, the organ is specified as the body movement-occurring organ, and a body movement artifact region is set (S41). The body movement artifact region is a region of an organ in the FOV among the organs specified as the body movement-occurring organ, and is adjacent to the phase encoding direction. The phase encoding direction is an application direction of a phase encoding gradient magnetic field set as an imaging condition.

Figure 5:
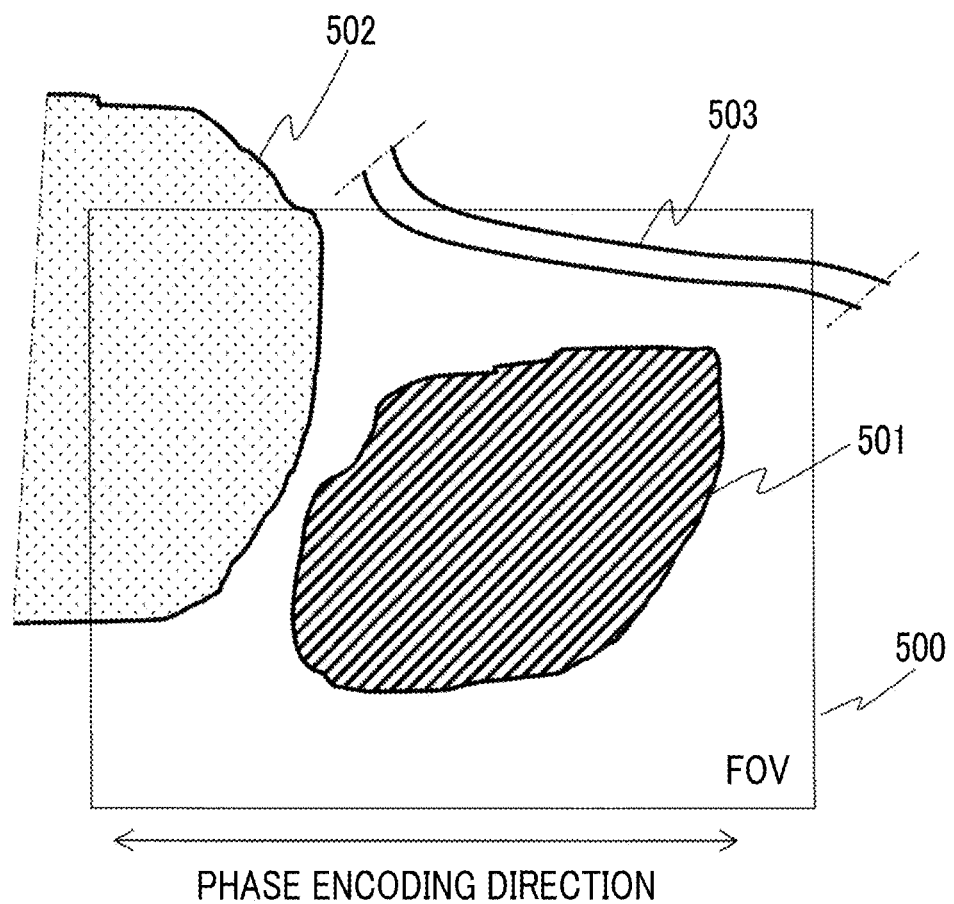
FIG. 5 is a diagram describing specification of a body movement-occurring region.

FIG. 5 schematically shows a state in which the body movement artifact region is set in the FOV. In the example shown in FIG. 5, as a result of the segmentation and the body movement-occurring organ specification, an organ (for example, a heart) 502 causing a body movement artifact and a blood vessel 503 causing a blood flow artifact are specified in the vicinity of the examination part 501, and these are included in a FOV 500 set around the examination part 501. In this case, the blood vessel 503 is not present on both sides of the examination part 501 in the phase encoding direction, but the organ 502 exists close to the phase encoding direction and is an organ in which an artifact is likely to occur, and a region of the organ 502 in the FOV is specified as the body movement artifact region.

The weighting amount calculation unit 223 calculates the weight of each channel of the reception coil used for the weighted reconstruction such that the signal from the body movement-occurring organ is minimized in the image reconstruction in order to reduce the artifact caused by the specified body movement-occurring organ.

Therefore, in the present embodiment, the weighting amount calculation unit 223 calculates the weight (weighting amount) of each channel, based on a signal amount (signal intensity) of an image (referred to as a channel image) reconstructed from the nuclear magnetic resonance signal received in each channel. Specifically, in each channel image, an evaluation value E(ch) of each channel is calculated by the following expression using the signal amount in the body movement artifact region set in step S4 and a signal amount in a region other than the body movement artifact region in the FOV set in step S2 (S51).

$$E(ch) = f(ch)/g(ch) \qquad (1)$$

In Expression (1), f(ch) represents a sum of squares of absolute values of signal intensities of ch's in a region excluding the body movement artifact region in the FOV, and g(ch) represents a total sum of absolute values of signal intensities of ch's in the body movement artifact region. The evaluation value E(ch) is not limited to Expression (1). f(ch) and g(ch) may be any real number power (for example, 0 or 0.5) instead of the square of the absolute value. For example, in a case where f(ch) is raised to the power of 0, f(ch) of the signal intensities in the FOV does not change for each ch (f(ch)=1), and the evaluation value reflects only the signal intensity of the body movement artifact region.

The evaluation value calculated in this way is higher as the signal intensity in the FOV is higher and the signal intensity of the body movement-occurring organ is lower, and is lower as the signal intensity in the FOV is lower and the signal intensity of the body movement-occurring organ is generated is higher. The weighting amount calculation unit 223 sets the weighting amount to be larger as the evaluation value is higher and to be smaller as the evaluation value is lower (S52). The weighting amount (weight W(ch)) is obtained, for example, as W(ch)=E(ch)/Σ(E(ch)). Alternatively, the evaluation values E(ch) are arranged in descending order (in order of magnitude), and the weight of ch in which the cumulative sum exceeds a certain threshold value is set to 1, and all others are set to 0. Further, threshold values E_Th1 and E_Th2 are set for the evaluation values, and in a case where E(ch)>E_Th1, the weight W=1, in a case where E(ch)<E_Th2, the weight W=0, and in a case where the evaluation value satisfies E_Th2≤ E(ch)≤ E_Th1, the weight of the channel is assumed to change linearly or non-linearly in a range of 0<W<1. The threshold value may be set to one (E_Th1=E_Th2), and the weight W may be set to 1 or 0. Alternatively, the threshold value may be set to 3 or more, and the weight may be changed in a multi-stage manner.

The reconstruction unit 225 (weighted reconstruction unit 226) performs the weighted reconstruction using the nuclear magnetic resonance signal received by each channel in the main scan (S6) (S7).

The weighted reconstruction is performed simply using the signal and the weight of each channel as in Expression (2) or further using a reception sensitivity distribution of each channel (small coil).

$$I = \sum I(ch) * W(ch) * S(ch) \qquad (2)$$

In Expression (2), S(ch) indicates a normalized sensitivity distribution of each channel.

In a case of parallel imaging in which the main scan is performed at a predetermined speed rate, aliasing removal reconstruction (SENSE, GRAPPA, or the like) using a sensitivity distribution of each channel may be performed.

According to the present embodiment, by reducing the weight of the channel in which the signal of the body movement-occurring organ is relatively strong, it is possible to suppress the signal from the body movement-occurring organ causing the artifact, and to obtain an image in which the artifact is reduced.

In addition, according to the present embodiment, since the region of the body movement-occurring organ, which is specified by the positioning image, in the image of each channel is specified by referring to the region, it is not necessary to understand the positional relationship between each channel and the examination part or the organ in advance, and it is possible to reduce the weight of the signal from the channel near the body movement-occurring organ.

According to the present embodiment, a configuration may be added in which the user changes the weight to any value after the image that has been subjected to the weighted reconstruction is presented to the user. For example, in the example of FIG. 5, in a case where the blood vessel 503 causing the blood flow artifact is specified as the body movement-occurring organ, and the weight of the channel having a high signal value from the organ is small, a blood vessel rendering ability is reduced, but in a case where the user wants to check the blood vessel, the blood vessel rendering ability can be increased by largely changing the weight of the channel. The setting by the user can be realized, for example, by displaying a UI representing the weight of the channel together with the display of the image on the UI unit 250 and receiving the user change.

FIG. 6 shows a reconstruction result illustrating the effects of the present embodiment. FIG. 6 is a diagram showing an imaging result of examination of the liver, and an upper left side thereof is an image of a channel CH10, in which a body movement artifact of the heart is mixed into the liver and the image quality is deteriorated. An upper right side of FIG. 6 is an image of a channel CH7, in which the artifact mixed into the liver is small. Note that both images have a difference in signal value due to a difference in sensitivity distribution. Accordingly, by reducing the weight of the channel CH10 and increasing the weight of the channel CH7 to perform image reconstruction, an image with reduced artifact can be obtained as shown on a lower right side.

Embodiment 2

In Embodiment 1, the positioning image is segmented, and the body movement-occurring organ is specified by collating the segmented positioning image with the body movement-occurring organ list, but in the present embodiment, the body movement-occurring organ is specified based on two or more images having different acquisition timings.

Figure 4:
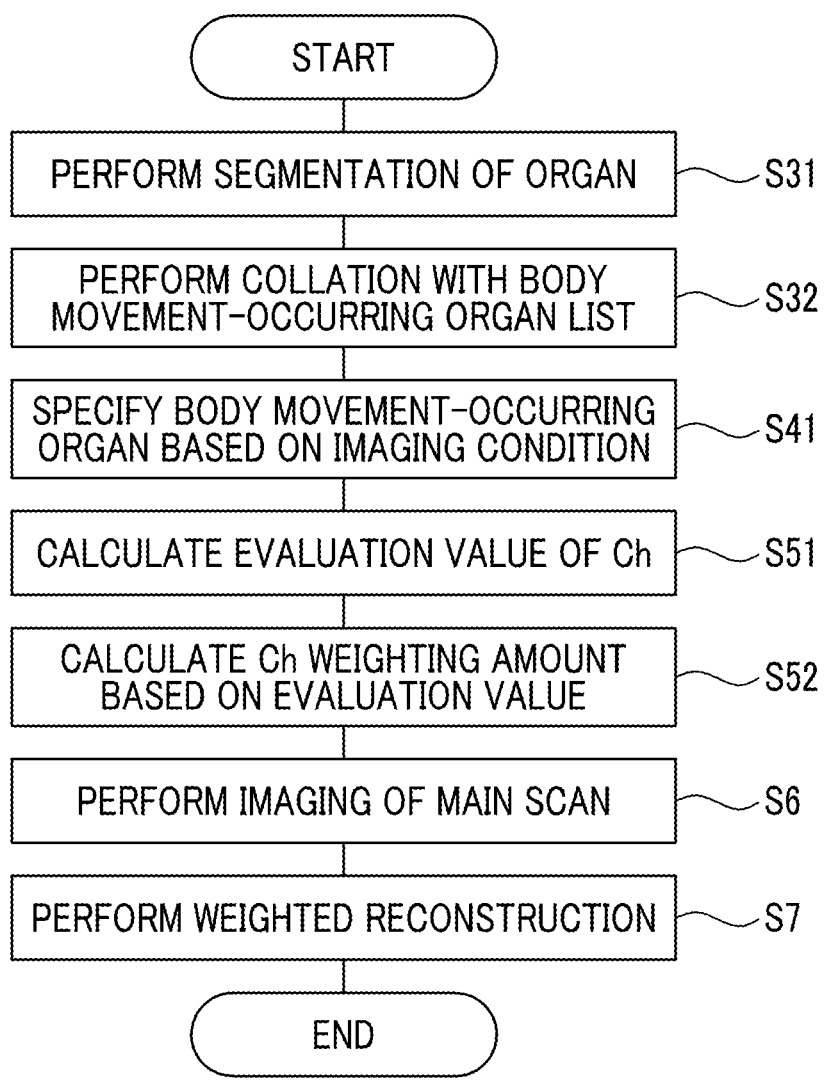
FIG. 4 is a flowchart showing processing of an operation unit of Embodiment 1.
Figure 7:
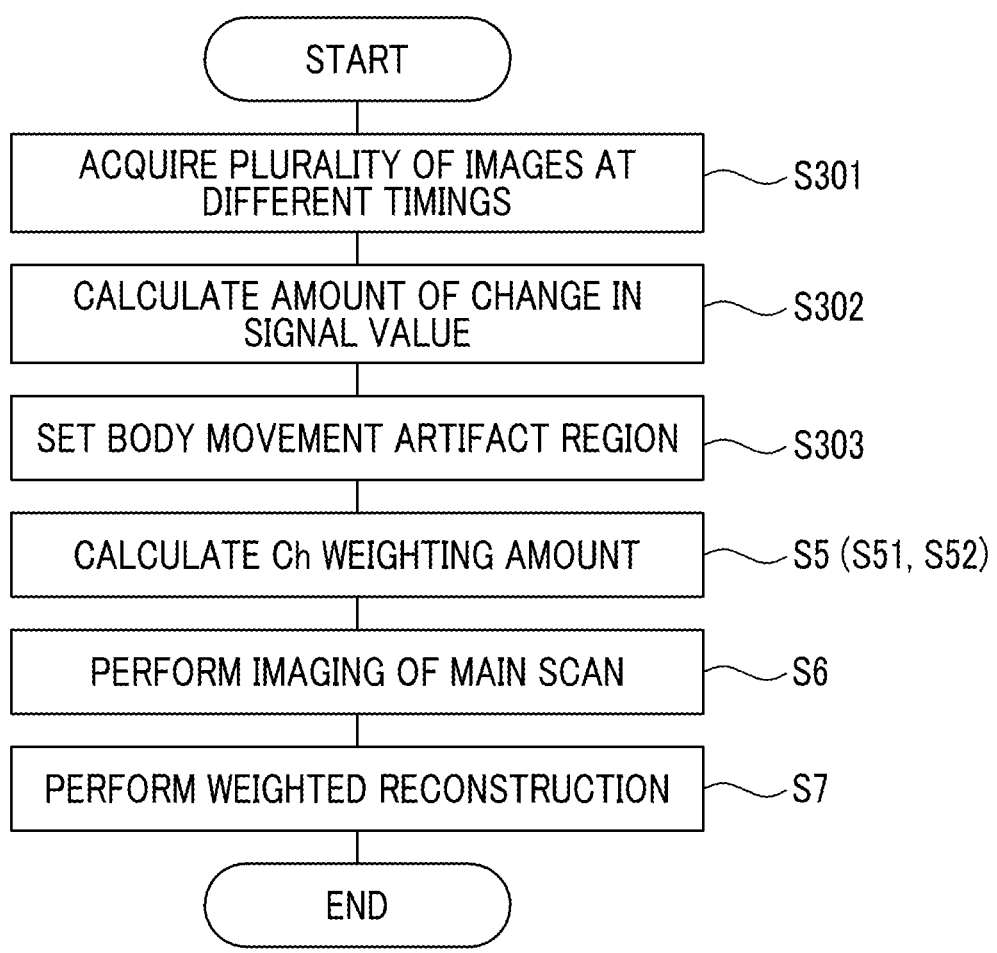
FIG. 7 is a flowchart showing processing of an operation unit according to Embodiment 2.

Hereinafter, the present embodiment will be described with reference to a flow of FIG. 7. In FIG. 7, the same processes as that in FIG. 4 are denoted by the same reference numerals, and redundant description will be omitted.

First, the positioning imaging is performed to acquire a positioning image, and imaging conditions such as the FOV are set (FIG. 3: S1 and S2).

Images having the same cross section as the positioning image are acquired at different timings (S301). The images at different timings need only be, for example, two or more images of different cardiac time phases or different respiratory time phases, and may be time-series images (cine images). The body movement-occurring organ specifying unit 221 takes a difference between a plurality of images acquired at different time phases (S302), specifies a region in which the amount of change in the signal value is large, and sets this region as the body movement artifact region (S303). In a case of the time-series images, the body movement artifact region may be specified based on the amount of variation in the signal value.

Thereafter, using the image of each channel, the evaluation value of each channel is calculated based on the signal amount of the body movement artifact region and the signal amount of the other region in the FOV, and the weighting amount is decided, and the signal of the main scan is subjected to the weighted reconstruction based on the decided weighting amount in the same manner as in Embodiment 1 (S5 to S7).

According to the present embodiment, although it is necessary to acquire a plurality of images, there is no need to collate the images with the body movement-occurring organ list, so that there is no need to create a list in advance, and it is possible to easily specify the body movement artifact region.

Modification Example of Embodiment 2

In Embodiment 2, the body movement artifact region is specified based on the change in the signal value of the images having different timings, such as the time-series images, but the channel may be directly specified from the time-series images without specifying the artifact region.

In this case, the variation in the signal amount (the signal amount of the FOV) of the time-series images of each channel is obtained, and the weight of the channel is decided based on the magnitude of the variation. In regard to the weight, a weight of a channel having a large variation is set to be small and a weight of a channel having a small variation is set to be large. In this case, it corresponds to a case where a value of k is set to 1 in Expression (1) for calculating the weighting amount of Embodiment 1, and the weight based on the signal amount of the artifact region in the FOV is omitted, but the weight can be easily calculated.

For the fluctuation in the time-series images, the body movement information obtained from the external apparatus may be referred to. For example, in the MRI examination, an external apparatus such as a belt for monitoring the respiratory movement is mounted on the abdomen, and the fluctuation due to the respiratory movement is recorded. With reference to this fluctuation, it is possible to specify the body movement artifact region which is a cause of the occurrence of the body movement artifact, by excluding other factors from the variation of the signal amount. In addition, the fluctuation associated with the respiratory movement may be referred to from a camera that moves in the bore.

In the present modification example, in the specification of the element in which the artifact is likely to occur, the application direction of the phase encoding gradient magnetic field is not taken into consideration, but the calculation of the weighting amount can be simplified.

EXPLANATION OF REFERENCES

10: MRI apparatus
100: imaging unit
102: static magnetic field coil
103: gradient magnetic field coil
105: transmission coil
106: reception coil
200: computer
210: measurement control unit
220: operation unit
221: body movement-occurring organ specifying unit
222: organ recognition unit
223: weighting amount calculation unit
224: evaluation value calculation unit
225: reconstruction unit
226: weighted reconstruction unit
230: display control unit
250: UI unit

What is claimed is:

1. A magnetic resonance imaging apparatus comprising:
an imaging unit that includes a reception coil, which has a plurality of channels, detecting a nuclear magnetic resonance signal generated by a subject, and that collects the nuclear magnetic resonance signal via the reception coil; and
one or more processors configured to conduct operation, wherein the one or more processors include
a reconstruction unit that reconstructs an image by using the nuclear magnetic resonance signal collected by each channel of the reception coil, and
is configured to specify an organ or a region causing a blood flow artifact or a body movement artifact in the subject by using a subject image reconstructed for each channel, and
decide a weight of each channel by using information on the specified organ or the region, and
the reconstruction unit performs weighted reconstruction by using the decided weight and the nuclear magnetic resonance signal of each channel.

2. The magnetic resonance imaging apparatus according to claim 1,
the one or more processors include a body movement-occurring organ specifying unit configured to specify an organ or a region causing a blood flow artifact or a body movement artifact in the subject by using a subject image reconstructed for each channel,
wherein the body movement-occurring organ specifying unit includes an organ recognition unit that recognizes an organ included in the subject image, and collates the organ recognized by the organ recognition unit with a body movement-occurring organ list registered in advance to specify the organ or the region causing the blood flow artifact and the body movement artifact.

3. The magnetic resonance imaging apparatus according to claim 1,
the one or more processors include a body movement-occurring organ specifying unit configured to specify an organ or a region causing a blood flow artifact or a body movement artifact in the subject by using a subject image reconstructed for each channel,
wherein the body movement-occurring organ specifying unit specifies the organ or the region causing the blood flow artifact and the body movement artifact in a FOV of the subject image.

4. The magnetic resonance imaging apparatus according to claim 3,
wherein the body movement-occurring organ specifying unit specifies the organ or the region causing the blood flow artifact and the body movement artifact based on a position in the phase encoding direction in the FOV.

5. The magnetic resonance imaging apparatus according to claim 3,
wherein the one or more processors obtain an evaluation value for the subject image of each channel by using a signal value in the FOV and a signal value of the organ or the region specified by the body movement-occurring organ specifying unit, and calculates a weighting amount based on the evaluation value.

6. The magnetic resonance imaging apparatus according to claim 1,
wherein the subject image is a positioning image acquired prior to main scan.

7. The magnetic resonance imaging apparatus according to claim 1,
wherein the one or more processors specify the organ or the region causing the blood flow artifact and the body movement artifact from two or more subject images acquired at different time points.

8. The magnetic resonance imaging apparatus according to claim 1, further comprising:
a UI unit that presents the organ or the region specified by the one or more processors or a weighting amount for each channel calculated by the one or more processors to a user.

9. An image reconstruction method of reconstructing an image of a subject by using a nuclear magnetic resonance signal collected by each of a plurality of channels of a reception coil, the method comprising:
specifying an organ or a region causing a blood flow artifact and a body movement artifact in the subject; and
deciding a weight of each channel by using information on the specified organ or region, and performing weighted reconstruction by using the weight.

10. The image reconstruction method according to claim 9,
wherein the specification of the organ or the region includes
a step of segmenting the organ using a positioning image of the subject, and a step of collating the segmented organ with a specific organ stored in advance to specify the organ causing the blood flow artifact and the body movement artifact.

11. The image reconstruction method according to claim 10,
wherein the decision of the weight includes a step of obtaining an evaluation value for a subject image of each channel by using a signal value in a FOV and a signal value of the specified organ or region, and
a weighting amount is calculated based on the evaluation value.

\* \* \* \* \*